March 1, 1927.  C. G. WILDERSON  1,619,049
MORTISING AND BORING MACHINE
Original Filed Oct. 10, 1923    2 Sheets-Sheet 1

Fig.1ª

INVENTOR

March 1, 1927.
C. G. WILDERSON
MORTISING AND BORING MACHINE
Original Filed Oct. 10, 1923      2 Sheets-Sheet 2
1,619,049
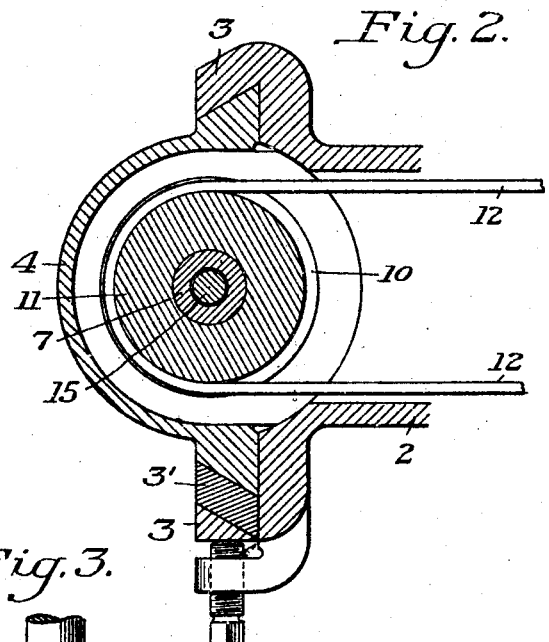
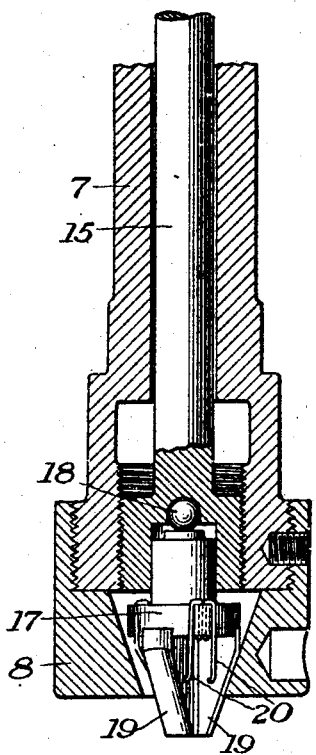
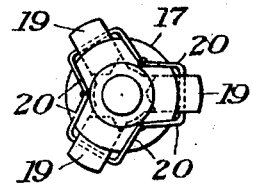
INVENTOR Patented Mar. 1, 1927.

1,619,049

UNITED STATES PATENT OFFICE.

CLINTON G. WILDERSON, OF LEETONIA, OHIO, ASSIGNOR TO THE CRESCENT MACHINE COMPANY, OF LEETONIA, OHIO, A CORPORATION OF OHIO.

MORTISING AND BORING MACHINE.

Application filed October 10, 1923, Serial No. 667,658. Renewed December 27, 1926.

The present invention relates to mortising and boring machines of the general type disclosed in my copending application, Serial No. 465,422, filed April 29, 1921.

In a machine of this type the bit should project from approximately $\frac{1}{16}''$ to $\frac{3}{32}''$ below the end of the chisel. Heretofore this adjustment of the bit with respect to the chisel has been made by filing or grinding off the end of the bit to give the proper projection thereof with respect to the chisel. This is a very tedious and delicate operation. By the present invention, I have provided a construction in which the adjustment of the bit may be made by raising or lowering the same with respect to the stationary chisel. Another feature of the invention resides in the provision of a novel form of chuck for gripping the bit.

In the accompanying drawings, there is shown, for purposes of illustration only, one embodiment of the present invention, it being understood that the drawings do not define the limits of the invention, as changes may be made in the construction therein disclosed without departing from the spirit of the invention or scope of my broader claims.

In the drawings:

Figure 1 is a fragmentary view partly in side elevation and partly in vertical section of a machine embodying my invention;

Figure 1ᵃ is a detail fragmentary view showing the relation of the lower end of the bit to the lower end of the chisel;

Figure 2 is a horizontal sectional view on the line II—II of Figure 1;

Figure 3 is an enlarged detail view, partly in section and partly in elevation, of the chuck and means for holding and adjusting the same; and Figure 4 is a plan view of the chuck.

Figure 1:
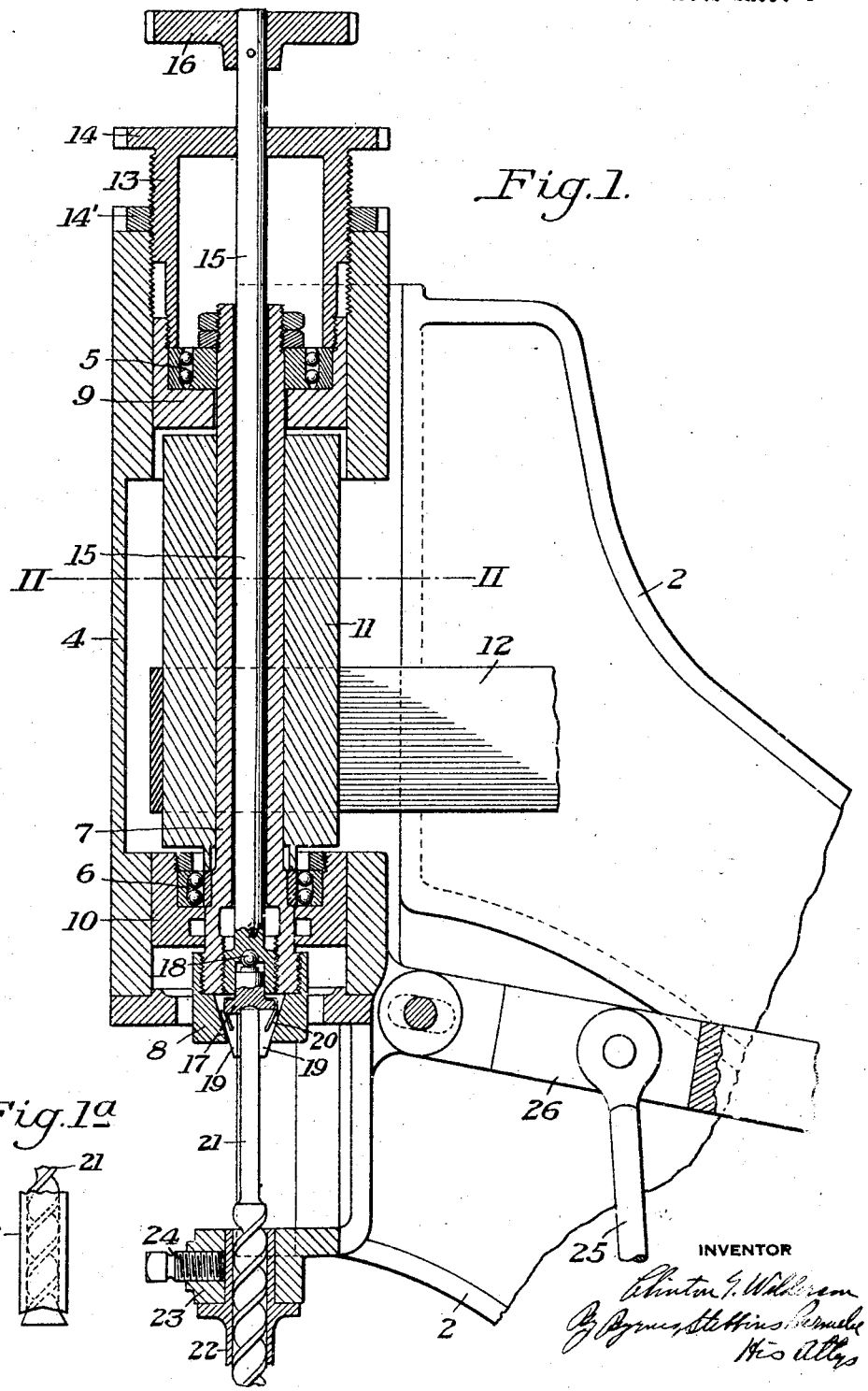

In the construction shown, the frame of the machine is indicated by the reference numeral 2. Slidable in suitable guides 3 in the frame is a sleeve 4, an adjustable shim 3' being provided for taking up wear.

Rotatably mounted within the sleeve 4 upon ball bearings 5 and 6 is a hollow spindle 7 having its lower end threaded to receive a chuck holder 8. The bearings 5 and 6 are carried by bearing blocks 9 and 10 slidably mounted in the sleeve 4. The hollow spindle 7 has keyed thereto a pulley 11 which extends between the bearing blocks and is engaged by a driving belt 12.

The upper end portion of the sleeve 4 is interiorly screw threaded and tapped thereinto is an adjustable sleeve 13 provided at its upper end with a hand wheel 14. The lower end portion of this adjustable sleeve is of reduced external diameter and is screw threaded and tapped into the bearing block 9, the bearing 5 being clamped in said bearing block by said sleeve. Threaded upon the sleeve 13 is a lock nut 14' for engagement with the upper end of the sleeve 4.

The lower portion of the hollow spindle 7 is interiorly screw threaded and a chuck closing member 15 is mounted within the spindle and has its lower end portion enlarged and exteriorly screw threaded for cooperation with said screw threads on the interior of the spindle. The member 15 extends up through the sleeve 13 and has mounted upon the upper end thereof a hand wheel 16. The lower enlarged end portion of the member 15 is hollow and receives the shank of a chuck 17. Seated in a recess in the interior of the lower enlarged end portion of the member 15 and engaging the upper end of the shank of the chuck is a ball bearing 18.

The chuck 17 comprises a plurality of jaws 19 which are connected to the body thereof by means of wires 20, as illustrated more clearly in Figures 3 and 4. It will be noted that the upper end portion of each jaw is seated in a slot in the chuck body and that the outer face of each jaw is beveled. The beveled outer faces of the jaws cooperate with the inclined inner surface of the chuck holder 8. The wires 20 are of spring material and tend to normally swing the jaws outwardly. The jaws are arranged to grip the upper end portion of the shank of a bit 21, which is rotatable in a hollow chisel 22 carried by an extension 23 of the sleeve 4, said chisel being fixed against rotation by means of a set screw 24.

The sleeve 4 is adapted to be moved in its guides 3 by means of the usual foot treadle (not shown) connected by a link 25 to a lever 26 which is pivoted at one end to the frame 2 and at its other end to the sleeve, a spring (not shown) being connected to the lever to normally maintain the sleeve in raised position.

It will be apparent that by turning the member 15 in the proper direction by means of the hand wheel 16, said member will be moved downwardly with respect to the hollow spindle 7, thereby causing the chuck jaws 19 to be moved into clamping engagement with the shank of the bit 21, by reason of the engagement of the inclined outer surfaces of the jaws with the inclined inner surface of the chuck holder. On the other hand, when the member 15 is rotated in the opposite direction to raise the member 15 with respect to the hollow spindle 7, the bit will be released by the chuck jaws. By the provision of a chuck of this character, bits with shanks having different diameters may be employed. It will also be apparent that by loosening the lock nut 14' and rotating the adjustable sleeve 13 in one direction or the other, hollow spindle 7 and cooperating parts may be raised or lowered to effect adjustment of the bit 21 with respect to the chisel 22.

The advantages of the present invention arise from the provision of means whereby the bit may be readily raised or lowered with respect to the stationary chisel, thereby obviating the necessity for filing or grinding off the end of the bit, and from the provision of a chuck and operating means therefor of novel form for holding the bit.

I claim:

1. In a mortising and boring machine, a support, a hollow spindle journalled in said support and having a chuck holder at its lower end, a chuck mounted within said chuck holder, an adjustable member mounted within said hollow spindle for operating said chuck, a hollow chisel carried by said support, a bit within said hollow chisel held by said chuck, and means for adjusting said chuck holder with respect to said support whereby to adjust said bit with respect to said chisel, substantially as described.

2. In a mortising and boring machine, a frame, a hollow support mounted for vertical movement in said frame, spaced bearing blocks within said support, a hollow spindle journalled upon bearings carried by said bearing blocks, a belt pulley carried by said spindle intermediate said blocks, a hollow chisel carried by said support, a bit within said hollow chisel, means carried by said hollow spindle for gripping said bit, means within said hollow spindle for actuating said gripping means, and means for adjusting said bearing blocks and parts carried thereby with respect to said support whereby to adjust said bit with respect to said chisel, substantially as described.

3. In a mortising and boring machine, a support, a hollow spindle journaled in said support and having a chuck holder at its lower end, a chuck mounted in said chuck holder, a stem within said hollow spindle for operating said chuck, operating means on the upper end of said spindle, a hollow chisel carried by said support, a bit within said hollow chisel held by said chuck, and means for adjusting said hollow spindle in said support whereby to adjust said bit with respect to said chisel, substantially as described.

4. In a mortising machine, a spindle support, a revolving spindle in the support, a chisel relatively fixed on the support with respect to the spindle, a chuck associated with the spindle, a chuck holder with which the chuck cooperates, said holders being adjustable longitudinally with respect to the spindle to change its point of cooperation with the chuck, and means for adjusting the chuck longitudinally of the spindle, whereby the gripping position of the chuck may be changed with respect to the spindle, and a bit associated with the chisel received in the chuck, substantially as described.

5. In a mortising machine, a supporting element, a spindle in the supporting element, a chisel in the supporting element, and a bit holding means on the spindle comprising cooperating elements vertically movable with respect to each other and to the spindle, substantially as described.

6. In a mortising machine, a supporting element, a spindle in the supporting element, a chisel in the supporting element, and a bit holding means on the spindle comprising cooperating elements vertically movable with respect to each other and to the spindle, said cooperating elements being operable from opposite ends of the spindle, substantially as described.

In testimony whereof I have hereunto set my hand.

CLINTON G. WILDERSON.